April 1, 1924.
J. N. HELTZEL
MOLD SUPPORT
Filed Feb. 5, 1923
1,488,637
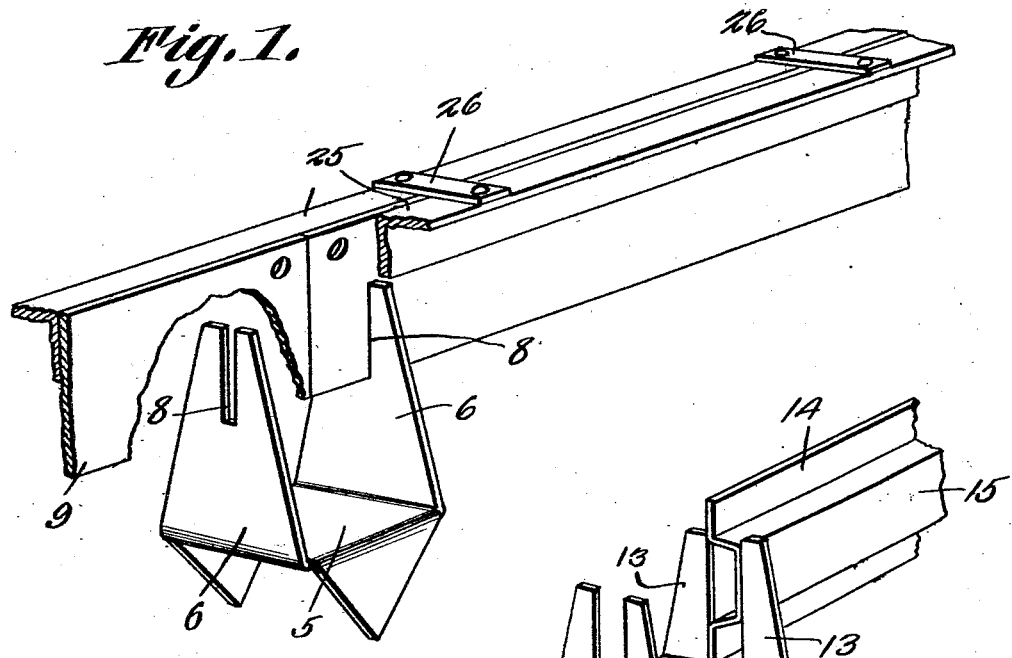
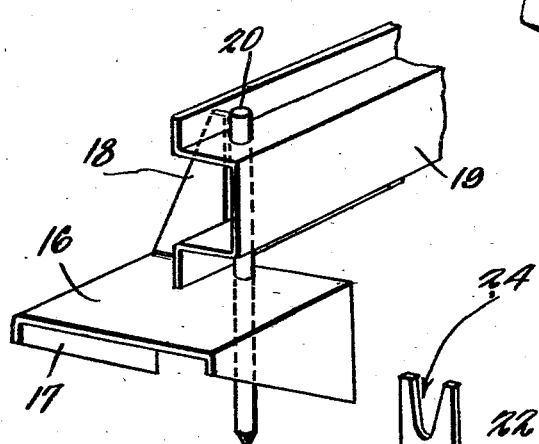
J. N. Heltzel
Inventor
By C. A. Snow & Co.
Attorneys Patented Apr. 1, 1924.

1,488,637

UNITED STATES PATENT OFFICE.

JOHN N. HELTZEL, OF WARREN, OHIO.

MOLD SUPPORT.

Application filed February 5, 1923. Serial No. 617,015.

*To all whom it may concern:*

Be it known that I, JOHN N. HELTZEL, a citizen of the United States, residing at Warren, in the county of Trumbull and State of Ohio, have invented a new and useful Mold Support, of which the following is a specification.

This invention relates to supports or devices commonly known as pedestals, the primary object of the invention being to provide a pedestal for receiving the division plates employed in road constructions for supporting the same in their proper positions while the concrete is being poured.

Another object of the invention is to provide a pedestal of this character which will connect and support adjacent ends of the division plates in a manner to permit the same to be readily and easily removed after they have accomplished their purposes if removal is desired.

A still further object of the invention is the provision of means for supporting the division plates, whereby the plates may be removed and carried forward in the construction of another section of the road, eliminating the necessity of using an unlimited number of division plates in road constructions.

With the foregoing and other objects in view which will appear as the description proceeds, the invention resides in combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a perspective view disclosing sections or division plates as supported within a pedestal.

Figure 2 is a modified form of a pedestal.

Figure 3 is a still further form of the pedestal.

Figure 4 is a further modified form of the pedestal.

Referring to the drawing in detail, the pedestal as shown by Figure 1 of the drawing, includes a base 5 having upwardly extended integral arms 6 disposed at the ends thereof, the side edges of the arms 6 tapering towards the upper ends thereof.

The arms 6 are formed with slots 8 which are of widths equal to the thicknesses of the division plates 9, which are supported therein, so that the division plates may be held against movement while in use, the arms may be cut out to correspond to the cross section of the division plates. As shown, the base 5 is relatively wide presenting sufficient supporting surface to prevent the pedestal from being forced into the ground surface on which the same is positioned.

In the form of the invention as illustrated by Figure 2 of the drawing, the pedestal is shown as including a base 10 formed with downwardly extending flanges 11 formed integral therewith, the side edges of the flanges 11 tapering as at 12 to permit the flanges to readily embed themselves in the ground surface. Spaced arms 13 are formed integral with the body portion between which arms are supported the division plates, it being understood that this particular form of pedestal is especially adapted for use in connection with a division plate such as indicated at 14, and wherein the division plate is formed with a longitudinal enlargement indicated at 15.

As shown, by Figure 3 of the drawing, the base of the pedestal is indicated at 16 and is formed with depending flanges 17, one portion of the base 16 being bent upwardly to provide an arm 18. One edge of this arm 18 is relatively straight to provide an abutting surface for the division plate 19, which is shown as held against the arm as by means of the stake 20 that extends through suitable openings in the division plate and passes through the base plate into the ground.

In Figure 4 I have shown a further form of pedestal which includes a base or supporting plate 21, which may be of any desired formation to which base is secured the body portion of the pedestal which embodies a relatively wide stake member 22 having its lower end tapered as at 23, to pierce the ground surface. A slot 24 is provided in the upper portion of the stake member 22 and accommodates the division plate used in connection therewith.

It might be further stated however that the body portion 10 of the pedestal shown by Figure 2 of the drawing, is formed with a central opening to accommodate the stake 24', which stake further secures the pedestal against movement longitudinally of the division plates supported thereby.

The use of the pedestal is believed to be clearly brought out by Figure 1 of the drawing in which are shown plates 9 as having their adjacent ends abutting and disposed between the arms 6 of the pedestal, thereby providing what is termed in the art, "as an expansion joint". It is to be understood that these division plates are formed of relatively flexible material and to this end aligning bars such as indicated at 25 are provided, the aligning bars being held in spaced relation with each other, as by means of the plates 26, the space between the bars being such as will accommodate the division plates 9 and prevent lateral movement thereof, while the concrete is being poured to form the road bed.

It is obvious that in the construction of a road, pedestals as shown and described by Figures 1 and 4, may be employed for supporting the division plates, while the concrete is being poured. When the concrete sets for a predetermined period, the division plates may be removed and moved forward on pedestals, to the end that the division plates may be repeatedly used for accomplishing their purposes, eliminating the necessity of using separate division plates for each section of road being constructed.

It is also obvious that in the construction of the road pedestals as shown and described in Figures 2 and 3, may be employed for supporting the division plates of a type that are left in place permanently. It is understood that division plates as shown in Figure 1, may be removed or left in place permanently, either of which may or may not be desirable.

What I claim as new is:—

1. A pedestal comprising a base, a slotted member having connection with the base and adapted to receive division plates therein, downwardly extended flanges formed on the base and adapted to pierce the surface on which the pedestal is positioned, and a stake passing through the body portion to secure the body portion against movement.

2. A pedestal comprising a base having a division plate and having upwardly inclined arms made integral therewith, said arms engaging in openings in a division plate and holding the division plate in an upright position.

3. A supporting and connecting pedestal of the class described, a base having a division plate and inclined arms to engage the ends of the division plates, providing a joint between the ends of division plates for supporting the ends of the division plates and holding them in upright position.

In testimony that I claim the foregoing as my own, I have hereto affixed my signature in the presence of two witnesses.

JOHN N. HELTZEL.

Witnesses:
W. E. CALDERWOOD,
M. M. BISHOP.